US006982821B2

(12) United States Patent  
Hecht

(10) Patent No.: US 6,982,821 B2  
(45) Date of Patent: Jan. 3, 2006

(54) OPTICAL BEAM POSITION ACTIVE SENSING USING SATELLITE BEAMS

(75) Inventor: David L. Hecht, Palo Alto, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 26 days.

(21) Appl. No.: 10/443,725

(22) Filed: May 22, 2003

(65) Prior Publication Data

US 2004/0233510 A1 Nov. 25, 2004

(51) Int. Cl.  
*G02F 1/33* (2006.01)
(52) U.S. Cl. .................. 359/305; 359/237; 359/285
(58) Field of Classification Search ............ 359/305, 359/285, 237, 307; 219/121.6, 121.61, 121.73, 219/121.78, 121.79  
See application file for complete search history.

(56) References Cited

U.S. PATENT DOCUMENTS 4,459,690 A 7/1984 Corsover et al.

(Continued)

OTHER PUBLICATIONS

Hecht, David L., "Advanced Optical Information Processing with Total Internal Reflection Electrooptic Spatial Light Modulators", International Conference on Optical Information Processing, Aug. 2-7, 1993, St. Petersburg, Russia; SPIE—The International Society for Optical Engineering, vol. 2051, pp. 306-324.

(Continued)

*Primary Examiner*—Ricky L. Mack  
*Assistant Examiner*—Brandi Thomas

(74) *Attorney, Agent, or Firm*—Fay, Sharpe, Fagan, Minnich & McKee, LLP

(57) ABSTRACT

A directed beam position sensing system and method includes a beam source configured to emit a beam. A satellite beam generator is aligned to receive the beam and to transmit a main beam portion and to generate a pair of symmetrically positioned satellite beams. A first detector arrangement is positioned to detect a first satellite beam of the pair and to generate a first detector signal. A second detector arrangement is positioned to detect a second satellite beam of the pair, and to generate a second detector signal, wherein the first detector signal and the second detector signal are used to determine a position of the main beam.

In accordance with another aspect of the present application, further provided is a second pair or satellite beams, wherein the first pair of satellite beams is generated at one of an x axis or a y axis, and the second pair of satellite beams is generated in the other axis. The first pair of satellite beams and second pair of satellite beams being perpendicular to each other and including third and fourth detectors to detect the position of the satellite beams.

In a further embodiment of the present application, a beam position sensing system includes a beam source configured to generate a directed beam. A satellite beam generator is aligned to receive the directed beam and to transmit a main beam and generate a single-sided satellite beam at a known position. A detector arrangement positioned to detect the satellite beam generates a detector signal. The detector signal is then used to determine the position of the main beam.

In accordance with another aspect of the present application, the satellite beam generator is a scanning satellite beam generator which scans the satellite beams, while transmitting a main beam substantially undisturbed.

49 Claims, 13 Drawing Sheets

U.S. PATENT DOCUMENTS

| | | | |
|---|---|---|---|
| 6,034,763 A | 3/2000 | Slater et al. | |
| 6,301,402 B1 | 10/2001 | Bhalla et al. | |
| 6,359,254 B1 * | 3/2002 | Brown | 219/121.71 |
| 6,411,751 B1 | 6/2002 | Giles et al. | |
| 2002/0185585 A1 * | 12/2002 | Jutte | 250/201.5 |
| 2004/0037193 A1 * | 2/2004 | Andersen et al. | 369/53.14 |

OTHER PUBLICATIONS

Marchant, Alan B., *Optical Recording: A Technical Overview*, 1990; Focus and Tracking Servos, 7.2 Tracking Sensors, pp. 172-188, 192-193.

"Sound Waves Shake Up Fiber-Optic Components", *FiberSystems International*, Nov./ Dec. 2002, p. 21-23.

Hecht, David L., "Embedded Data Glyph Technology for Hardcopy Digital Documents", *Color Hard Copy and Graphic Arts III*, Feb. 7-10, 1994, San Jose, California; SPIE—The International Society for Optical Engineering, vol. 2171, pp. 341-352.

Mitra, A. et al., "Determination of Laser Ablation Threshold of Teflon at Different Harmonics of Nd:YAG Laser Using Photothermal Deflection Technique", *Journal of Materials Science* 34 (1999), pp. 615-619.

Chen, Jinghong, et al., "Tilt-Angle Stabilization of Electrostatically Actuated Micromechanical Mirrors", *Nanotech* 2003, vol. 2, www.nsti.org, ISBN 0-9728422-1-7, pp. 424-427.

Hecht, David L., "Characteristics of Acoustooptic Devices for Signal Processing", 1985 Ultrasonics Symposium, 1985 IEEE, 0090-5607/85/0000-0369, pp. 369-379.

"Position Sensing and Alignment Engineering Guide", Duma Optronics Ltd., http://www.duma.co.il, pp. 1-20.

Portable Alignment Laser System, OT-4040, On-Trak Photonics, Inc., www.on-trak,com, 6 pages.

Sharman, Paul, "Position Sensing With Photodiodes", *Final Draft of Position Sensing Article for LFW*—printed Apr. 7, 2003, pp. 1-6.

Acousto-Optic X-Y Scanning System, Electro-Optical Products Corporation, http://www.eopc.com/dtsxy100_dtsxy250_dtsxy400.html, Apr. 7, 2003, 9 pages.

* cited by examiner

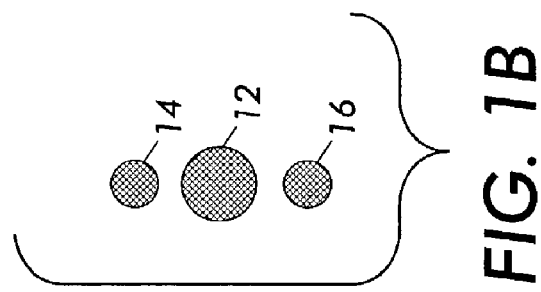
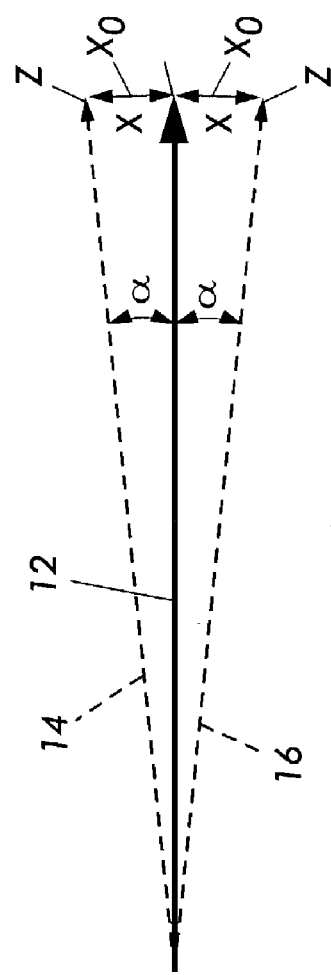
FIG. 1A
FIG. 1B

OPTICAL BEAM POSITION ACTIVE SENSING USING SATELLITE BEAMS

BACKGROUND OF THE INVENTION

The present application is directed to beam position detection and control, and more particularly to systems and methods that enable sensing the position of a beam along one or more axes while minimally perturbing or interfering with the beam, and, when appropriate, moving of the beam to control its position.

A number of beam sensing systems and methods are known. One type of system senses the beam itself. For example, in Bhalla et al., U.S. Pat. No. 6,301,402, the main beam is dithered in order to provide appropriate alignment information and control. However, during sensing of beam position, the beam cannot be used normally for its intended purposes. This shortcoming delays or impacts desired operational use of the beam.

Another beam sensing system, U.S. Pat. No. 4,459,690 to Corsover et al. describes a single dithered beam system, where the output from a light source is split by a beam splitter into a plurality of beams. This plurality includes a light beam (PBT) used for tracking a guide track (T) of an optical disc. The tracking is accomplished by dithering the PBT beam that impinges as a light spot ($P_T$) upon guide track (T). The dithered beam (PBT) is used for tracking purposes in both a playback and record mode. In a preferred embodiment, the playback beams are split by an optical grating and dithered by an acousto-optic device. Such a system generates an error signal which is to be driven to zero, but it does not teach measuring the position of a beam over a variable range. Corsover et al., therefore, show a teaching for sensing a relative distance from a track which is a fixed feature. It does not teach sensing of an actual position of a main beam which permits for adjustable control.

Accordingly, a new system which provides highly accurate, highly responsive position sensing and/or control is desirable. The system should provide minimal disturbance of the main beam in its operation, while preferably providing precision sensing and also providing both rapid response and long-term stability. Such a system would be anticipated to have applicability in a variety of beam sensing applications, including that for beam position control. Control of a beam in this manner has applicability in a variety of environments, including laser printing, medical laser systems, precision laser instruments, optical switch networks, free space laser communication, high power lasers, as well as other industrial and academic settings.

SUMMARY OF THE INVENTION

A directed beam position sensing system and method includes a beam source configured to emit a beam. A satellite beam generator is aligned to receive the beam and to transmit a main beam portion and to generate a pair of symmetrically positioned satellite beams. A first detector arrangement is positioned to detect a first satellite beam of the pair and to generate a first detector signal. A second detector arrangement is positioned to detect a second satellite beam of the pair, and to generate a second detector signal, wherein the first detector signal and the second detector signal are used to determine a position of the main beam.

In accordance with another aspect of the present application, further provided is a second pair of satellite beams, wherein the first pair of satellite beams is generated at one of an x axis or a y axis, and the second pair of satellite beams is generated in the other axis. The first pair of satellite beams and second pair of satellite beams being perpendicular to each other and including third and fourth detectors to detect the position of the satellite beams.

In a further embodiment of the present application, a beam position sensing system includes a beam source configured to generate a directed beam. A satellite beam generator is aligned to receive the directed beam and to transmit a main beam and generate a single-sided satellite beam at a known position. A detector arrangement positioned to detect the satellite beam generates a detector signal. The detector signal is then used to determine the position of the main beam.

In accordance with another aspect of the present application, the satellite beam generator is a scanning satellite beam generator which scans the satellite beams, while transmitting a main beam substantially undisturbed.

BRIEF DESCRIPTION OF THE DRAWINGS

FIG. 1A illustrates a partial top view of a laser beam sensing arrangement via the use of symmetric satellite beams, wherein the satellite beams are in an initial state;

FIG. 1B is an end view of FIG. 1A;

DETAILED DESCRIPTION OF THE PREFERRED EMBODIMENTS

Figure 1C:
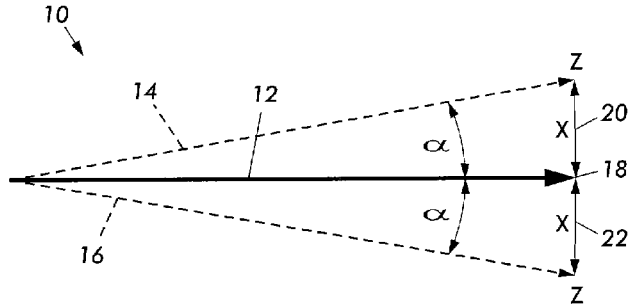
FIG. 1C illustrates a partial top view of a laser beam sensing arrangement via the use of symmetric satellite beams.
Figure 1D:
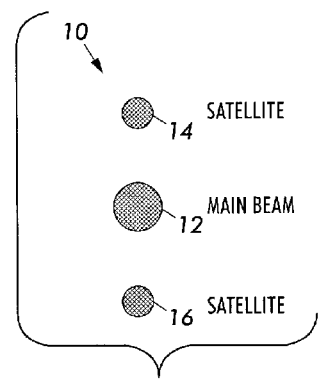
FIG. 1D depicts an end view of FIG. 1C.

FIG. 1A is a top view of beam arrangement 10, such as a laser beam acoustic beam, which includes a main beam 12, and a pair of symmetric, oppositely positioned satellite beams 14 and 16. Each of the satellite beams 14 and 16 are $1^{st}$ order diffracted beams, positioned offset by equal distances 20, 22 from an actual position 18 of main beam 12. FIG. 1B illustrates a partial end view of beam arrangement 10 where satellite beams 14, 16 are equally distanced, in opposite directions, from main beam 12. In FIGS. 1A and 1B the satellite beams 14, 16 are in an initial beam position deviation ($x_0$) from the mainbeam 12. FIGS. 1C and 1D show beams 14, 16 at a subsequent position deviation (x) from the main beam 12. The deviations shown in FIGS. 1A–1D are defined by:

x=Z tan α(which is similar to x=αZ for small angles), where Z is beam length and α is a deflection angle.

Use of beam arrangement 10 enables the sensing of the position of main beam 12 along one dimension, while minimally perturbing main beam 12. This feature may be applied to a wide variety of beam sensing applications, particularly for position control.

As will be explained in more detail in connection with FIGS. 2A–2B, beam arrangement 10 permits precision position sensing of main beam 12 along one axis or direction (e.g., the x axis) by accurate detection of the time of crossing for each satellite beam 14, 16 past a referenced position. In one embodiment, the satellite beam reference crossing is sensed by a differential output bi-cell photo-detector, such as those which may be used in start of scan (SOS) and end of scan (EOS) detectors in laser printing raster output scanning (ROS) systems. The satellite beams can be generated by a variety of satellite beam generators such as transmissive or reflective diffraction grating devices and/or beam splitters. A preferred generator element is an acousto-optic cell functioning as a diffraction modulator. In some implementations the satellite beam generators are static elements. However, in preferred embodiments, the satellite beam generators are variable and act as signal modulators, and the satellite beams are scanned (or dithered). In one instance, an acousto-optic cell scans the symmetric satellite beams by sweeping the frequency of an RF drive, used to control operation of the acousto-optic cell.

Systems built in accordance with the concepts depicted in FIGS. 1A–1D cause minimal disturbances to the main beam and its operation while providing scanned sensing via the satellite beams. The symmetric design enables the establishment of the main beam as centered between the satellite beams, whether their position is stationary or varied. This design enables both accurate position sensing and long-term system stability.

Figure 2B:
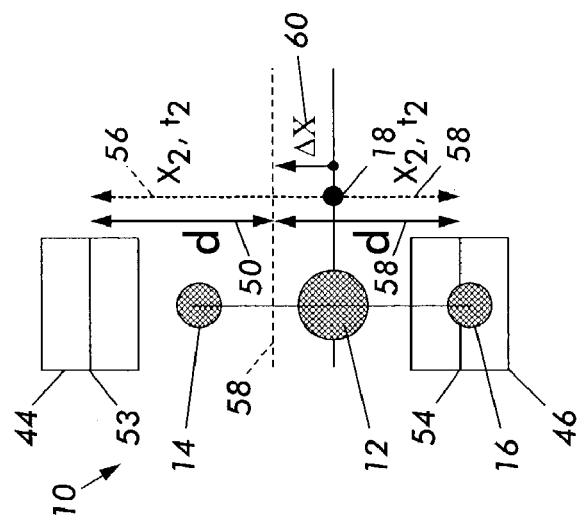
FIG. 2B shows a partial end view more particularly illustrating the detectors of the present embodiment.
Figure 2A:
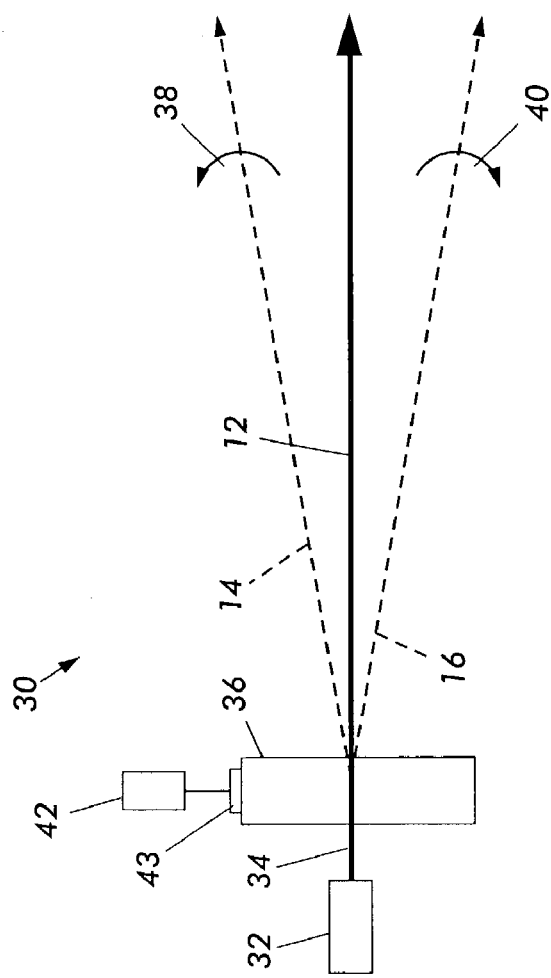
FIG. 2A sets forth amore detailed partial top view of one embodiment for a laser beam position sensing via opposite symmetric scanned satellite views with beam detectors.

FIG. 2A, illustrates a beam position sensing system 30 incorporating opposite symmetric satellite beams 14 and 16, positioned an equal distance from main beam 12. In system 30, a beam source 32, such as a laser, emits a beam 34 transmitted to a satellite beam generator 36, arranged to diffract the two $1^{st}$ order satellite beams 14 and 16. Main beam 12 is a zero order diffracted beam and is directly transmitted through satellite beam generator 36. The satellite beams are preferably a small fraction of the main beam power.

In a preferred embodiment, satellite beam generator 36 scans each of the symmetric satellite beams through predetermined paths 38, 40. As the satellite beams are scanned through the predetermined paths, main beam 12 is maintained substantially unaffected. As mentioned previously, in one implementation, where satellite beam generator 36 is an acousto-optic modulator, the scanning of the beams is achieved by modulating the frequency of an RF frequency generator 42, providing signals to the piezoelectric transducer 43 of acousto-optic modulator satellite beam generator 36. For typical frequencies, acousto-optic deflection is a small angle linearly proportional to frequency for a good approximation.

The deflection angle is given by:

$\alpha = 2n \arcsin(\lambda f/2nV_A)$ or approximately ($\lambda f/V_A$) for small angles where, λ is the optical wavelength,
L is the grating thickness (interation length),
$V_A$ is the acoustic velocity,
Λ is the acoustic wavelength,
n is the optical index of refraction, and
f is the acoustic frequency.

By this design, the deflection provides substantially constant angular velocity for linear frequency sweeps. Consequently, the satellite beam linear velocity in the axis of the detectors is substantially a constant magnitude (V) in opposite directions. Optionally the frequency sweep may be adjusted to linearize the scan with respect to residual active and passive optical scan angle nonlinearity.

Turning to FIG. 2B, depicted is an end view of system 30, and more clearly disclosing detectors 44 and 46, which sense the crossing of satellite beams 14 and 16 respectively. As noted, in one embodiment, detectors 44, 46 may be differential output bi-cell photodetectors (i.e., differential split detectors), which provide precision crossing time measurements as sensed from a zero crossing of the differential outputs.

For discussion purposes, main beam position 18 in FIG. 2B is not at system centerline 48. The differential split detectors 44, 46 are separated a fixed distance 50, 52 (2d) from the system position 48, and the distances of the detector midlines 53, 54 from the actual main beam position 18 are defined as $x_1$ (56) and $x_2$ (58). For the arrangement shown in FIG. 2B:

$x_1 = d_x + \Delta x; \quad x_2 = d_x - \Delta x,$ where Δx (60) is the offset position of the actual main beam position 18 from the system centerline 48.

Therefore, $\Delta x = [x_1 - x_2]/2.$

To the approximate linearity of a scan, the scan velocity ($V_x$) scales distances to times by:

$x_1 = x_0 + V_x * t_{1x};$ $x_2 = x_0 + V_x * t_{2x},$ where $t_{1x}$ and $t_{2x}$ are scan times from start of scan to each detector crossing event and $x_0$ is the symmetric satellite beam position deviation from the main beam at the start of scan.

The offset Δx may therefore be determined by:

$\Delta x = [t_{1x} - t_{2x}] * V_x/2.$

The satellite beam initial position deviation from the main beam $x_0$ need not be determined or precisely controlled in this embodiment since because this variable is eliminated in the symmetric satellite beam embodiment position determination. Also, it can be shown when the satellite beam generator is an acousto-optic modulator, the time measurements and the relations in the symmetric satellite beam method above may be used to determine and calibrate the scan velocity $V_x$ as well as the initial angle deviation $x_0$, as follows:

For an optical path length Z and deflection angle from the main beam α, it has been shown the linear displacement from the main beam is:

$x = Z \tan \alpha$ or $Z*\alpha$, for small α.

Also, it is recalled from above:

$\alpha = 2n \arcsin(\lambda f/2nV_A)$ or approximately $(\lambda f/V_A)$ for small angles.

Then, for small angles:

$x = Z*\alpha = Z(\lambda f/V_A) = f*(Z\lambda/V_A)$

In particular, for the start scan position, $x_0 = f_0*(Z\lambda/V_A)$ where $f_0$ is the scan start frequency, and the velocity is the first time derivative of the position along the scan:

$V_x = dx/dt = df/dt*(Z\lambda/V_A)$, where df/dt is the time rate of change of the scan drive frequency which is a constant in the linear scan case.

Since the sum $x_1+x_2$ is the constant reference distance measure between the two position sensor reference positions, the scan measurement equations can be added to give a key result:

$x_1 = x_0 + V_x*t_{1x}$, and $x_2 = x_0 + V_x*t_{2x}$, therefore $x_1+x_2 = 2d = 2*x_0 + V_x*(t_1+t_{2x})$ The expressions for $x_0$ and $V_x$ in terms of scan frequencies may then be substituted to give:

$2d = 2f_0*(Z\lambda/V_A) + df/dt*((Z\lambda/V_A)*(t_{1x}+t_{2x})$, which can be rearranged as:

$2d = [2f_0 + df/dt(t_{1x}+t_{2x})]*(Z\lambda/V_A)$ or $(Z\lambda/V_A) = 2d/[2f_0 + df/dt(t_{1x}+t_{2x})] = C$.

Since $2f_0$, df/dt, $t_{1x}$ and $t_{2x}$ are precisely measurable frequency and time variables, the parameter combination C can be determined and calibrated.

Then we have from above:

$x_0 = f_0*(Z\lambda/V_A)f_0*C$ $V_x = dx/dt = df/dt*(Z\lambda/V_A) = df/dt*C$, which are likewise precisely calibratable.

With continuing attention to the symmetric satellite beam embodiments, even if the scan rate of the satellite beam generator 36 is not linear in time, the offset (Δx) will move to zero when $[t_{1x}-t_{2x}]$ goes to zero in the symmetric deflection scheme of FIGS. 2A and 2B. Hence, use of the symmetric satellite beam configuration allows for the design of a robust beam position sensing system capable of providing accurate main beam position data independent of internal and/or external condition variations or fluctuations.

As will be discussed in greater detail below, the described sensing operation may be used to control and/or maintain the position of main beam 12. In one instance, this position control may be achieved by calibration of the relation:

$x_1 = g_{1x}(t_{1x})$;

$x_2 = g_2(t_{2x})$, where $g_{1x}$ and $g_{2x}$ are preferably the same function in the symmetric scheme here and are the frequencies applied to the satellite beam generator in the x axis, i.e.:

$g_{1x} = g_{2x}$.

Therefore, $$\Delta_x = \frac{x_z - x_2}{2} = \frac{g_{1x}(t_{1x}) - g_{2x}(t_{2x})}{2}.$$

With continuing attention to satellite beam generator 36, it has been mentioned that in one embodiment an acousto-optic cell is used to generate the satellite beams 14, 16 and to transmit the zero order main beam 12. In an acousto-optic cell, an RF signal is applied to a piezo-electric transducer, bonded to a suitableoptically transparent medium, thereby generating an acoustic wave. This wave induces an optical phase grating traveling through the medium at the acoustic velocity of the material and with a grating period wavelength dependent upon the acoustic wavelength and hence the frequency of the RF signal. An incident laser beam is diffracted by this grating, which generally may produce a number of diffracted order beams, depending on the thickness of the grating (or interaction length).

It is well known that a normalized thickness parameter called the Q determines the number of significant diffraction orders which may appear. Q is given by:

$Q = 2\pi \lambda L f^2/n \Lambda^2 = 2\pi \lambda L f^2/nV_A$, where

λ is the optical wavelength,

L is the grating thickness (interation length), $V_A$ is the acoustic velocity,

Λ is the acoustic wavelength, and n is the optical index of refraction, and f is the acoustic frequency.

When Q is much less than 1 (Q<<1), the acousto-optic cell is operating in what is known as the Raman-Nath mode and there are several diffraction orders ( ... −2, −1, 0, 1, 2, 3 ... ) with intensities given by Bessel functions.

On the other hand, when the Q factor is much greater than 1 (Q>>1), the acousto-optic cell is operating in the Bragg mode. In this operation, at one particular incidence angle, only one first diffraction order is produced. The other orders are suppressed by destructive interference. The 1st order beam may be scanned when the frequency controlling the acousto-optic cell is varied across an RF bandwidth.

In the present application, the acousto-optic cell is preferably operated in an intermediate regime between a Raman-Nath or Bragg mode where Q is approximately 1 with approximately normal optical incidence on the acoustic field and symmetric diffraction into +1 and −1 diffracted orders. In this regime the efficiency of both the first diffraction orders is optimized while unnecessary higher orders are suppressed. It is to be understood that an acousto-optic cell operating in the Raman Nath mode could be used. However, the efficiency of the system would be poorer; i.e., more RF power is required for the desired diffraction efficiency.

In the experimental implementation undertaken by the inventors, an acousto-optic cell designed for operation in a Bragg mode which would normally be operated in the vicinity of 40 MHz has been used. However, in this implementation, the operational frequency is shifted to below 30 MHz, reducing the acousto-optic Q of the cell. In this range, the acousto-optic cell may be operated in an axial mode to produce two symmetric $1^{st}$ order beams (i.e., satellite beams 14, 16, scanable over a range of frequencies).

Further, it is to be mentioned that while in a preferred embodiment the satellite beam generator is described as an acousto-optic cell, beam modulators, variable gratings, beam splitters, vibrating mirrors, optical wedges or other appropriate devices may be used to generate and/or scan the satellite beams.

Similarly, while the detectors are shown in a preferred embodiment as differential split detectors, pixel detectors, beam centroid sensors or other appropriate beam sensors, may be used to detect the satellite beams. Particular types of sensors which may be used are position sensing detectors (PSD), which are photoelectric devices that convert an incident light spot into continuous position data. Two particular position sensing devices are quadrant detectors and lateral effect detectors.

Figure 3A:
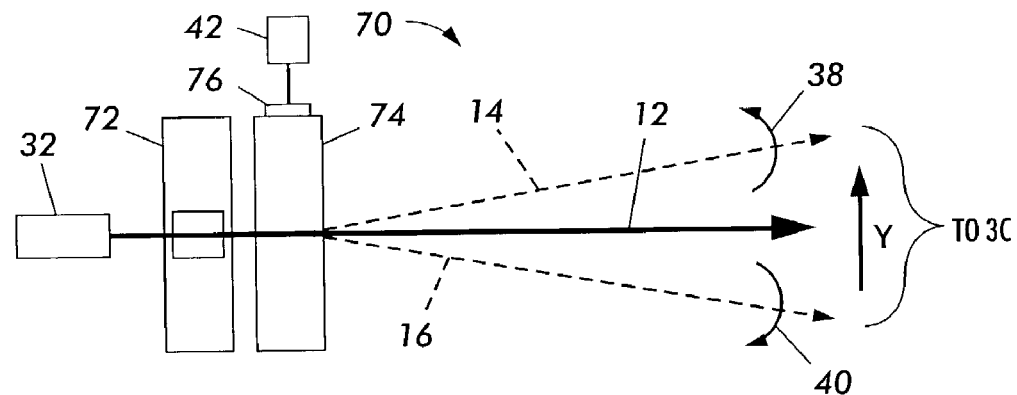
FIG. 3A is a partial top view of a laser beam position sensing system for sensing in both the x and y axes using two pairs of satellite beams generated by two separate beam generators such as acoustic-optic modulators.
Figure 3B:
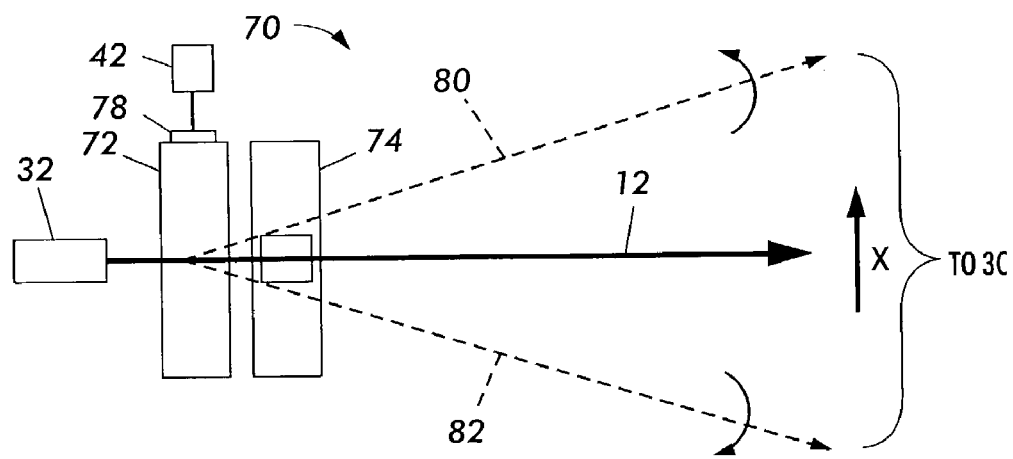
FIG. 3B sets forth a partial side view of the arrangement shown in FIG. 3A.
Figure 3C:
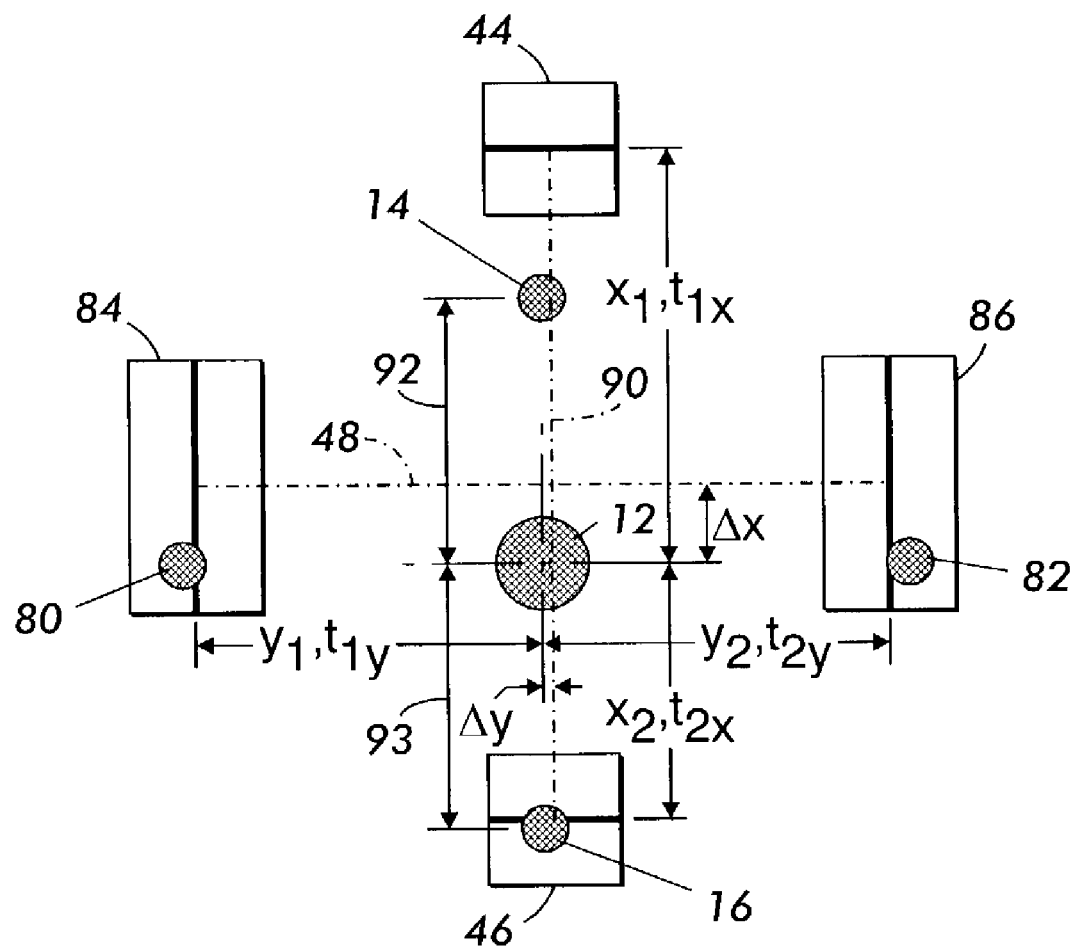
FIG. 3C depicts a partial end view more particularly showing the detectors implemented in the system shown in FIGS. 3A and 3B respectively.

Turning to FIGS. 3A–3C, illustrated is a laser beam position sensing system 70 which permits two-axis sensing by use of two satellite beam generators 72 and 74. The axes may be orthogonal if desired. In top view, FIG. 3A, satellite beam generator 74, is an acousto-optic cell with transducer 76, and which transmits main beam 12 as the undeflected zero order diffraction beam and generates symmetric $1^{st}$ order diffracted satellite beams 14 and 16. Acousto-optic cell 72 is aligned to generate satellite beams 14, 16 in a first axis (e.g., the y axis). While this provides a degree of position sensing, it is appreciated that also providing position sensing in a second axis (e.g., the x axis) results in additional functionality of two dimensional beam position sensing, and hence information for two dimensional positioning control of main beam 12. In side view, FIG. 3B, main beam 12 is still shown as being transmitted as a zero order diffracted beam through acousto-optic cell 72. In this design transducer 78 is operated to generate a second set of satellite beams 80, 82 in the x axis. This two-axis extension of FIGS. 2A–2B is characteristic in that acousto-optic cells 72 and 74 are both able to interact with main beam 12 each generating a symmetric pair of first diffraction order beams. Preferably the total portion diffracted to the satellite beams should be limited to a moderate fraction of the main beam, which may vary depending on the implementation, but as a general case maybe approximately 10% or less.

For position detection and control, it maybe desirable that the two-axis (x, y) design having the two pairs of satellite beams (80, 82 and 14, 16) be perpendicular to each other. However, it is to be understood it is not required that the sets of beams be perpendicular to each other. In these situations, the specific geometry of such a design will need to be taken into account when determining sensing and control functions.

FIG. 3C is an end view for two-axis system 70 wherein detectors 84, 86 are positioned in the y axis for operation similar to detectors 44 and 46 in the x axis. Since the two sets of satellite beams in the different axes are perpendicular to and independent of each other, the calculations to determine the offset from an ideal y axis centerline position may be used for those signals in the y axis as used in the x axis. More particularly the main beam position offset in the x and y axes are determined by:

$$\Delta x=[t_{1x}-t_{2x}]*V_x/2; \text{and}$$

$$\Delta y=[t_{1y}-t_{2y}]*V_y/2.$$

Similar to the embodiment of FIGS. 2A, 2B, the two sets of satellite beams are scanned by operation of the frequency supplied to the respective acousto-optic cells. The relationships between elements substantially are the same in the y axis as those discussed in relation to the x axis. Particularly, detectors 84 and 86 are positioned an equal distance from the system (y axis) centerline 90. When the actual system (y axis) centerline 92 is shown in this example to be a distance from the ideal main beam (y axis) centerline 90, the difference is the offset ($\Delta y$) 93 in the y axis. This geometric positioning results in similar equations being used both in the x and y axes. Thus, the distances of the midlines of the detectors from the actual main beam centerline in the y axis are $y_1$ and $y_2$, with:

$$y_1=d_y+\Delta_y; y_2=d_y-\Delta_y,$$

$\Delta y$ is the offset of the position of the main beam from the midline between the two split detectors. Therefore:

$$\Delta y=[y_1-y_2]/2.$$

To obtain approximation of a linearity of scan, the scanned velocity scales distances to times by:

$$y_1=V_y \times t_{1y}; y_2=Vy*t_{2y}.$$

Therefore, offset in the y axis is:

$$\Delta y=[t_{1y}-t_{2y}]*V_y/2.$$

It is to be appreciated, that even if the scan is nonlinear in time, the offset will go to zero when $[t_{1y}-t_{2y}]$ goes to zero due to the symmetric deflection scheme arrangement. Thus, robust centering of the y axis is possible independent of internal and/or external condition variations. If it is desired to use this sensing operation to control and/or maintain the position of main beam 12 in the y axis, correction operations can be employed. In general, all that is needed is calibration information on the relation, specifically, $$y_1=g_{1y}(t_{1y}); y_2=g_{2y}(t_{2y}),$$

where $g_{1y}$ and $g_{2y}$ are the frequencies applied to the satellite beam generator in the y axis.

Since the frequency should be the same in the present symmetric scheme, then:

$$g_{1y}=g_{2y}.$$

Thus, the x and y satellite beam sense systems may be operated independently of each other, as well as simultaneously to each other. On the other hand, with existing beam sensing and control methods which provide dithered sensing of the main beam itself, two dimensional dithered sensing is generally not workable.

Figure 4A:
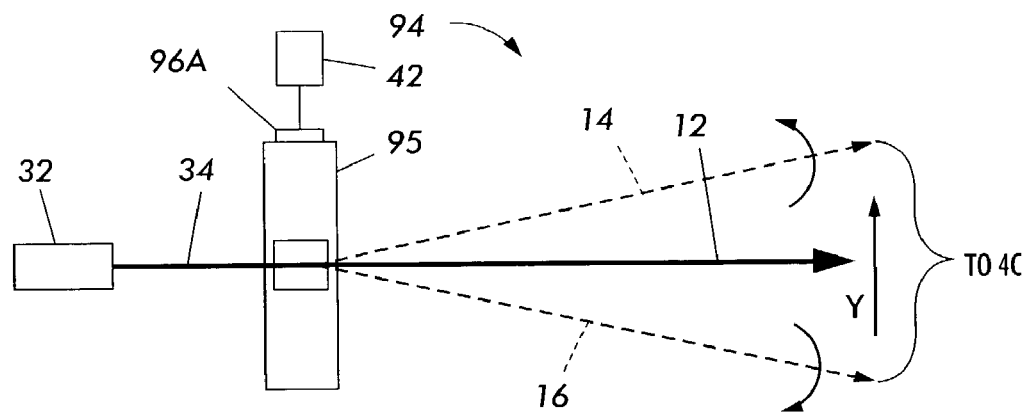
FIG. 4A is a partial top view of a laser beam position sensing system implementing two-axis satellite beams, using a single two-axis beam generator such as a two-axis acousto-optic modulator.
Figure 4B:
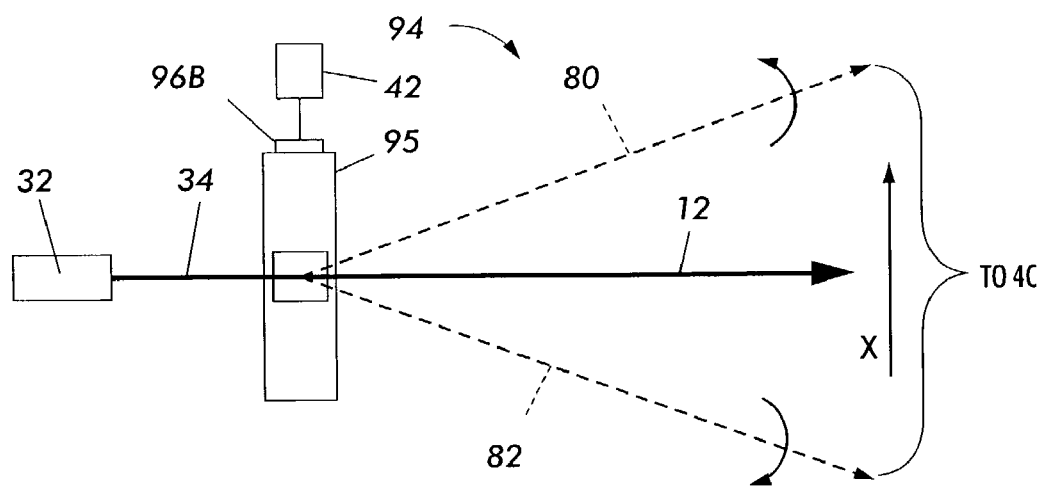
FIG. 4B is a partial side view of the system shown in FIG. 4A.
Figure 4C:
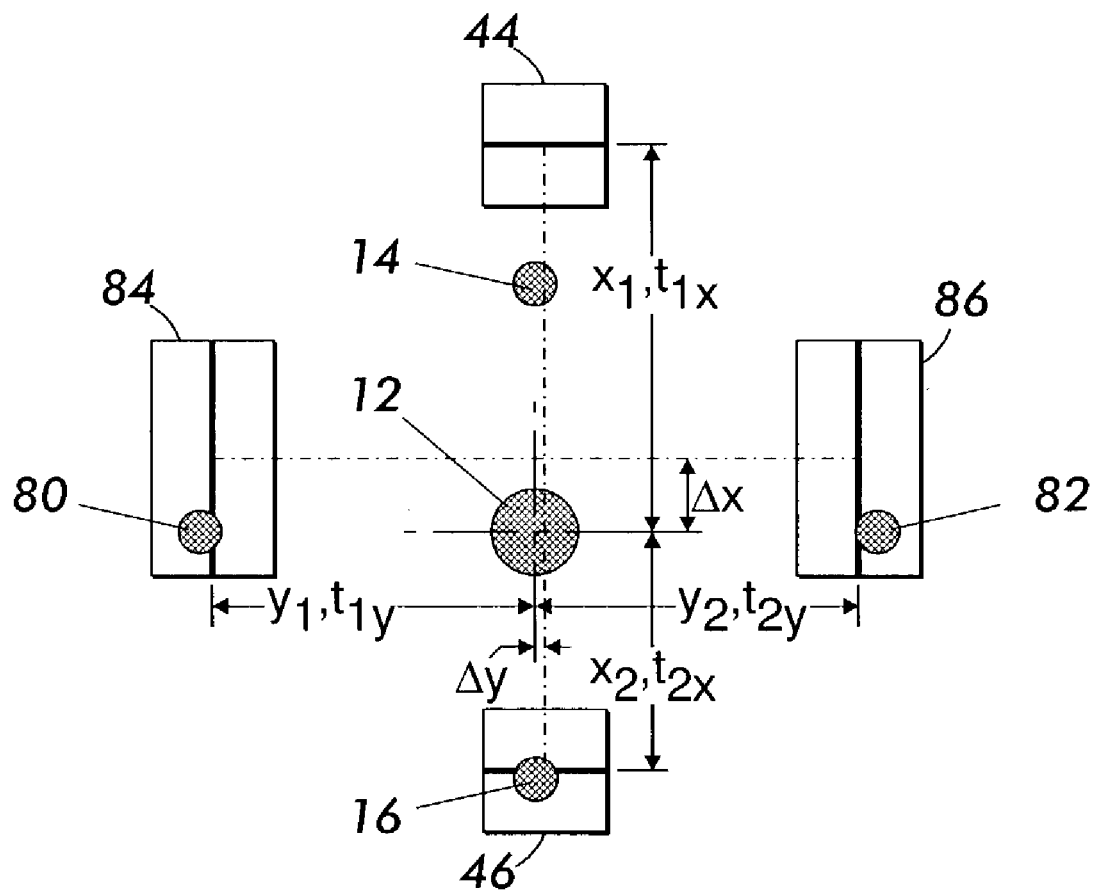
FIG. 4C sets forth a partial end view more specifically illustrating the detectors for the system of FIG. 4A and FIG. 4B.

Turning to FIGS. 4A–4C, a further embodiment of a two-axis satellite beam system 94 using a two-axis beam generator 95, such as a two-axis acousto-optic modulator cell with transducers 96a, 96b, is illustrated. In this design, the acousto-optic cells are integrated on a single substrate. This configuration has similar operational concepts as FIGS. 3A–3C. However, due to the use of an integrated two-axis acousto-optic cell design, the embodiment of FIGS. 4A–4C has two fewer optical surfaces. On the other hand, the simultaneous adjustment of the two modulators' angular alignment with less adjustment degrees of freedom may be less convenient, although angle tolerance should not be critical in the lower Q axial mode. Finally, the overlapping integrated structure may enhance second order spurious cross-diffracted beams when both axes are operating simultaneously. This is true since both sound beams are interacting with both sets of $1^{st}$ order diffraction simultaneously in the same volume. It is estimated that if the two axes have equal diffraction efficiencies, then the second order spurious cross beams should be about four times more intense than they would be in the separate configuration of FIGS. 3A–3C. This effect can also be prevented by separating the interactions with transducers displaced along the optical beam path, resulting in a single thicker two axis acousto-optic cell. Applicants note that detectors 44 and 46 are shown sized differently than detectors 84 and 86. In other embodiments, the detectors may be sized and configured the same. However, FIGS. 3C and 4C illustrate that this is not a requirement.

Figure 5:
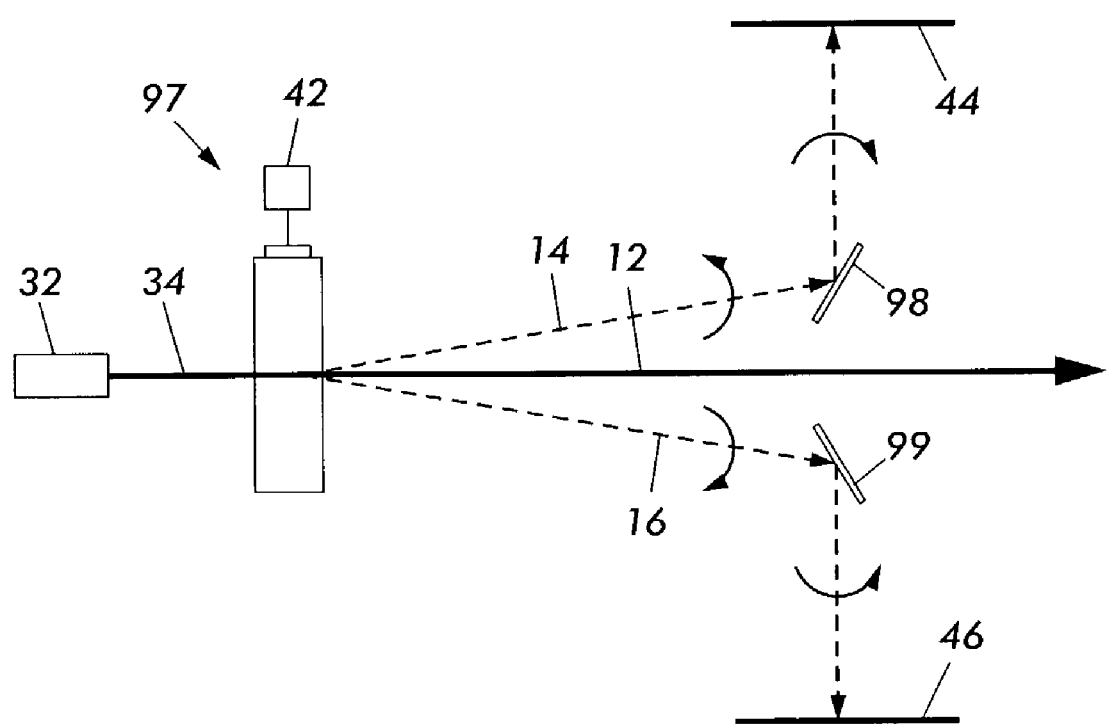
FIG. 5 illustrates an alternative embodiment for detecting the satellite beams.

The foregoing embodiments depict the satellite beams as being emitted and detected in the same physical space as the main beam. However, this is not a requirement, rather deflection of the satellite beams may be undertaken to direct the satellite beam as desired. For example, in system 97 of FIG. 5, mirrors 98 and 99 are arranged to deflect satellite beams 14 and 16 to detectors 44 and 46, respectively positioned at alternative locations from the previous embodiments. This design is provided to emphasize it is not necessary for the satellite beams to be detected in the same space or plane as the main beam. For example, in embodiments where the main beam, may enter a destructive environment or isolated location, it may not be desirable to include the detectors in that environment or location. Such re-positioning may also be useful if the location imposes size constraints making it difficult to incorporate the beam detectors. However, in this embodiment the deflecting mirrors and beam detectors will require superior mechanical stability.

The foregoing discussion primarily focuses on a symmetric active sensing system, taking advantage of the generation of a pair or a set of pairs of symmetric satellite beams positioned in relationship to a main beam. It is possible, however, to employ an asymmetric system using a single-sided satellite beam to sense main beam position data when the initial scan position and scan velocity can be accurately determined.

Particularly, when the beam generating device is an acousto-optic cell, operation of the cell in a Bragg mode results in a single satellite beam. It is to be understood other types of beam generators may be used to generate a single-sided satellite beam output. Therefore, in the system shown in FIGS. 2A and 2B, for example, one of the satellite beams 14 and 16 is eliminated. The corresponding detectors 44 or 46 will also be unnecessary. In such a design, by knowing the initial scan position and the scan velocity, the main beam position is obtained through the use of a single-sided satellite beam. For example, similar to one beam of the two-beam system, to approximate the linearity of a scan, the scan velocity ($V_x$) scales distances to times by:

$$x_1 = x_0 + V_x * t_{1x},$$

where $t_{1x}$ is the scan time from a start of scan for the detector crossing event, $x_0$ is the single-sided satellite beam position deviation from the main beam at the start of scan and $v_x$ is the scan velocity. In this case $x_1$ is the determined distance from the single sensor, which is the meaningful output of the single-sided system.

Figure 6:
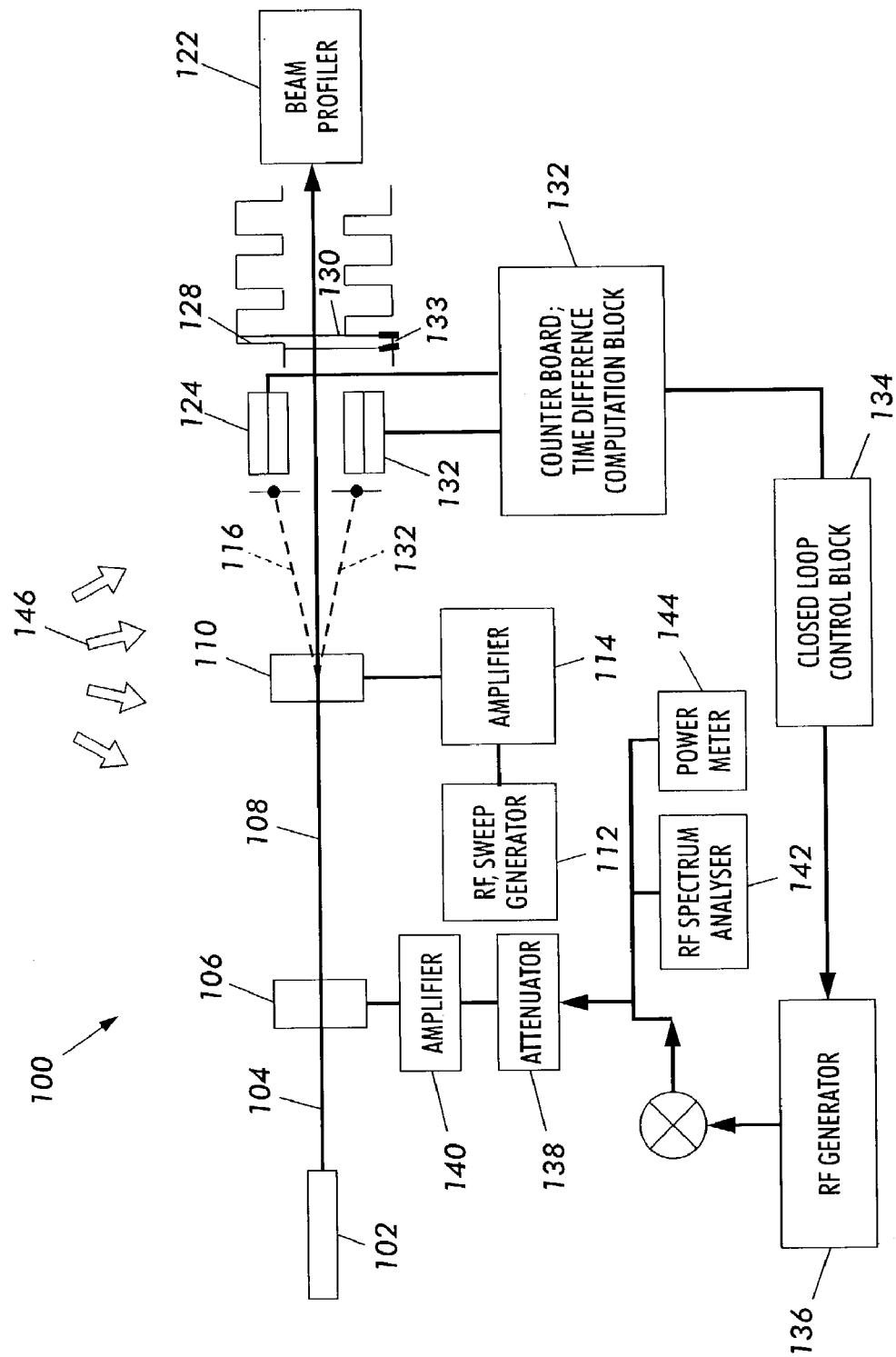
FIG. 6 depicts a block diagram for a laser beam sensing and control system through the use of satellite beams in accordance with the context of the present application.

Additionally, the systems illustrated in FIGS. 3A–3C, 4A–4C, 5 and the system of FIG. 6 may also operate in this single-sided satellite beam mode. With particular attention to FIGS. 3A–3C and FIGS. 4A–4C (where pairs of satellite beams are provided in both the x and y axes) beam generators may be operated to generate the single-sided beam in each of the x and y axes. Thus, single-sided beam position sensing accomplished via the single-sided embodiments in both the x and y positions.

The initial beam position is obtained by a variety of known methods, including an initial calibration through the use of external mechanical and/or electronic measuring devices, as is known in the art. It is also to be appreciated that, as in the two-sided embodiments the detectors, though described as primarily split detectors, may also be representative of position sensing detectors (PSD), which provide a continuous position signal of the single-sided satellite beam.

Turning to FIG. 6, shown is a block diagram for a laser beam sensing and control system 100 which implements the described position sensing satellite beam concepts. While for convenience FIG. 6 shows satellite beams in a single axis, it is to be recognized system 100 may be used in connection with the dual satellite beam systems having satellite beams existing in the x and y axes as previously described.

Control system 100 may implement a variety of control schemes to cause the main beam to be steered to a desired alignment. A particular scheme is known as proportional integral derivative (PID) control. In PID control, the corrective action uses the proportional part of the control dependant upon the magnitude and sign of the error signal. The time integral of the error, or the magnitude of the error multiplied by the time that it has persisted, is addressed by the integral portion of the scheme, and the time rate of change of the error (i.e., a rapidly changing error causes a greater corrective action than a slowly changing error) is addressed by the derivative part of the control.

In an intuitive sense, the derivative part of the controller attempts to look ahead and foresee if the process is in for a larger change than might be expected based on present measurements. That is, if the measured variable is changing very rapidly, it is likely that it is going to try to change by a large amount. This being the case, the controller attempts to predict the value of the change and applies a more corrective action than would be initially considered appropriate.

It is to be appreciated that while a PID controlled scheme is described as a preferred embodiment, other control systems may also used, including proportional integral (PI) control or any other scheme which would use the sensed position data to maintain or re-position the main beam.

Control system 100 enables determining a position of a main beam via sensing the satellite beams while minimally perturbing the main beam itself and further includes, when needed, a re-positioning of the main beam, by actuating closed loop control, based on sensed positions of the satellite beams.

With continuing attention to FIG. 6, a beam source 102, such as a laser, emits a beam 104 received by a beam deflector 106. The beam deflector 106 may be a $TeO_2$ acousto-optic modulator operating, for example, in a Bragg mode, although other beam deflectors may also be used such as one of many types of controllable mirrors. In this embodiment the acousto-optic deflected beam 108 is passed to a satellite beam generator 110, configured as a previously disclosed acousto-optic cell or other appropriate satellite beam generation device. Satellite beam generator 110 is supplied with a signal from RF sweep signal generator 112 amplified by RF amplifier 114. The sweep signal scans or dithers satellite beams 116 and 118. Main beam portion 120 passes through satellite beam generator 110 substantially undisturbed to target 122.

In this embodiment, the acousto-optic deflected beam 108 is passed to a satellite beam generator 110, which is configured as a previously disclosed acousto-optic cell or other appropriate satellite beam generation device. Satellite beam generator 110 is supplied with a signal from RF sweep signal generator 112 amplified by RF amplifier 114. The RF signal scans or dithers satellite beams 116 and 118. Main beam portion 120 passes through satellite beam generator 110 substantially undisturbed to a target 122, such as a beam profiler.

Main beam portion 120 is intended to be positioned at a specific location on target 122. However, it is understood that due to external interferences, imperfections in the system components or for other reasons, main beam portion 120 may not align to an ideal position. Control system 100 is therefore designed to not only sense a position of the main beam portion 120, but to also, if needed, alter the location/alignment of main beam portion 120. Control system 100 first determines the position of the main beam portion as previously described, and then acts to re-align the main beam portion, when needed, to obtain an accurate (desired) alignment.

The position sensing operation occurs as previously described where satellite beams 116 and 118 are scanned or dithered across detectors 124, 126, are such as differential split detectors, to acquire data needed for position sensing. Detectors 124 and 126 provided with zero-crossing detection circuits to generate output temporal signals 128, 130, where in this embodiment the output signals are rectangular pulses with edges occurring at times corresponding to the time of crossing of the satellite beams (116, 118) past the split detector center lines, respectively. As shown in this example, edges of signal 128 are shifted from the edge timing of signal 130. This information is used to determine the position of the main beam portion a and any offset from the desired main beam portion position. The amount and direction of the offset ($\Delta x$) is determined by reference to the previously recited relationships. Control system 100 uses the obtained position information to provide feedback control for a control scheme, such as PID control, to alter the position of $1^{st}$ order deflected beam 108 and in turn main beam portion 120.

Specifically, output signals 128 and 130 from detectors 124 and 126 are supplied to a time difference computation block 132, which determines a time difference between satellite beams 116, 118 as they are scanned to detectors 124 and 126.

The time difference calculated by computation block 132 may, in this embodiment, be the time difference ($\Delta t$) 133 between signals 128 and 130, where having $\Delta t$ at zero indicates the main beam portion 120 is at the nominal centerline position. The computation of this time delay is undertaken by the previously described relationships. Computation block 132 may be part of a computer or may be a separate computational device. In embodiments when other detectors are used, for example, when PSD detectors 44, 46, 84, 86 are used, position detection of the beams may be continuously and directly obtained.

The time difference information or data is provided to a controller such as control block 134 which incorporates a known control scheme, such as PID or other appropriate control. Control block 134 may be part of the computer system, or alternatively, data from computation block 132 is provided to control block 134 via an interface such as a PCI interface. Control block 134 takes the time differential information ($\Delta t$), which may be provided as a continuous stream of data, or as data blocks, and generates a compensation signal designed to alter the output of RF generator 136. The output of the RF generator is adjusted by attenuator 138, amplified by amplifier 140 and then supplied to acousto-optic deflector 106. When corrective movement of beam 108 is required, based on the time difference data, control block 134 instructs RF generator 136 to generate a signal having a frequency different from an existing signal frequency being supplied to acousto-optic deflector 106. Altering the frequency of the signal supplied to the acousto-optic cell 106 alters the deflection angle of the $1^{st}$ order diffracted beam 108, as detailed previously. In other embodiments appropriate beam deflection signals would be generated; for example, a mirror tilt adjustment signal.

Hence, altering the RF frequency moves the $1^{st}$ order beam 108 generated at acousto-optic cell 106. The degree of movement is determined by the frequency supplied which in turn is dependant on the output from detectors 124 and 126. An RF spectrum analyzer 142 and power meter 144 are provided to monitor the signal operation of control system 100 in a laboratory implementation.

The time difference between the signals from detectors 124 and 126 is used to control the output of RF generator 136 to steer the main beam portion 120 to a desired position. This position is in one embodiment based on a calibrated control portionality constant for effective servo control. For critically damped control, the beam maybe positioned within noise limits (+/−1/60 beam diameter—experimentally realized) based on one pair of zero crossing readings.

With continuing attention to FIG. 6, a main beam, such as main beam portion 120, may not be located at its ideal position due to perturbations inserted into the system. These can occur due to changes within the system, such as individual components not operating within expected parameters, or it may be due to external environmental conditions or actions (i.e., a bumping or movement of the system). Lines 146 are used to designate perturbations (both internal and external). Particularly, lines 146 represent an external jarring of the system as well as other external or internal beam position altering factors. Control system 100 is therefore designed to move the main beam portion 120 to a desired location in response to the occurrence of such internal or external perturbations. It is to be noted that system 100 may be designed whereby the nominal centered position and the desired position are not necessarily the same location. As has been used herein, the nominal centered position may be a location where zero time difference offset signal exists. However, in some situations a user may wish that the main beam portion be located at a position offset somewhat from the nominal center position. This may be accomplished simply by selection of appropriate parameters for the controller to provide a desired offset, which would be well known to one of ordinary skill in the art.

It is to be noted the control system described therein may be used with each of the sensing systems described throughout FIGS. 1A–5, and the corresponding single-sided satellite beam sensing systems. In that regard, for the embodiments using sensing in both the x and y axes, for both the two-sided embodiments and the single-sided embodiments, main beam movement will occur in both the x and y axes. To accomplish this task, in one embodiment, and as previously mentioned, the beam deflector 106 may be one of many types of angle-controllable mirrors which allow movement in the x and y axes. Alternatively, acousto-optic cells such as those shown in FIGS. 3A, 3B, 4A and 4B may also be implemented in the Bragg mode. By this design, operation of the appropriate acousto-optic cell for movement in the corresponding axis, i.e., the x or y axis, is undertaken to move the $1^{st}$ order beam 108. In this embodiment, there would be additional output signals corresponding to output signals 128 and 130 from the additional detectors such as detectors 124 and 126. The time difference computation block 132 is then simply configured to receive the signals, and using previously described processes, determine time differences for detection in the both the x and y axes. Thereafter, the controller, such as control block 134, is designed to provide corrective signals to an RF generator 136. In this embodiment, the RF generator is connected to beam deflectors for operation in the x and y axes, and provides an output signal through the attenuator 138 and amplifier 140 to such a beam deflector 106.

Beam actuation or steering of a closed-loop control is provided in existing systems by the use of mechanical devices such as the rotating or movable mirrors. The position sensing approaches and systems described in the foregoing discussion is applicable to such systems. Further, the acousto-optic actuation or steering approaches and systems implemented in the described control systems may also be implemented separate from the sensing operations described herein. Particularly, the beam actuation systems may be used in a variety of implementations where high-speed free response is of value.

Figure 7:
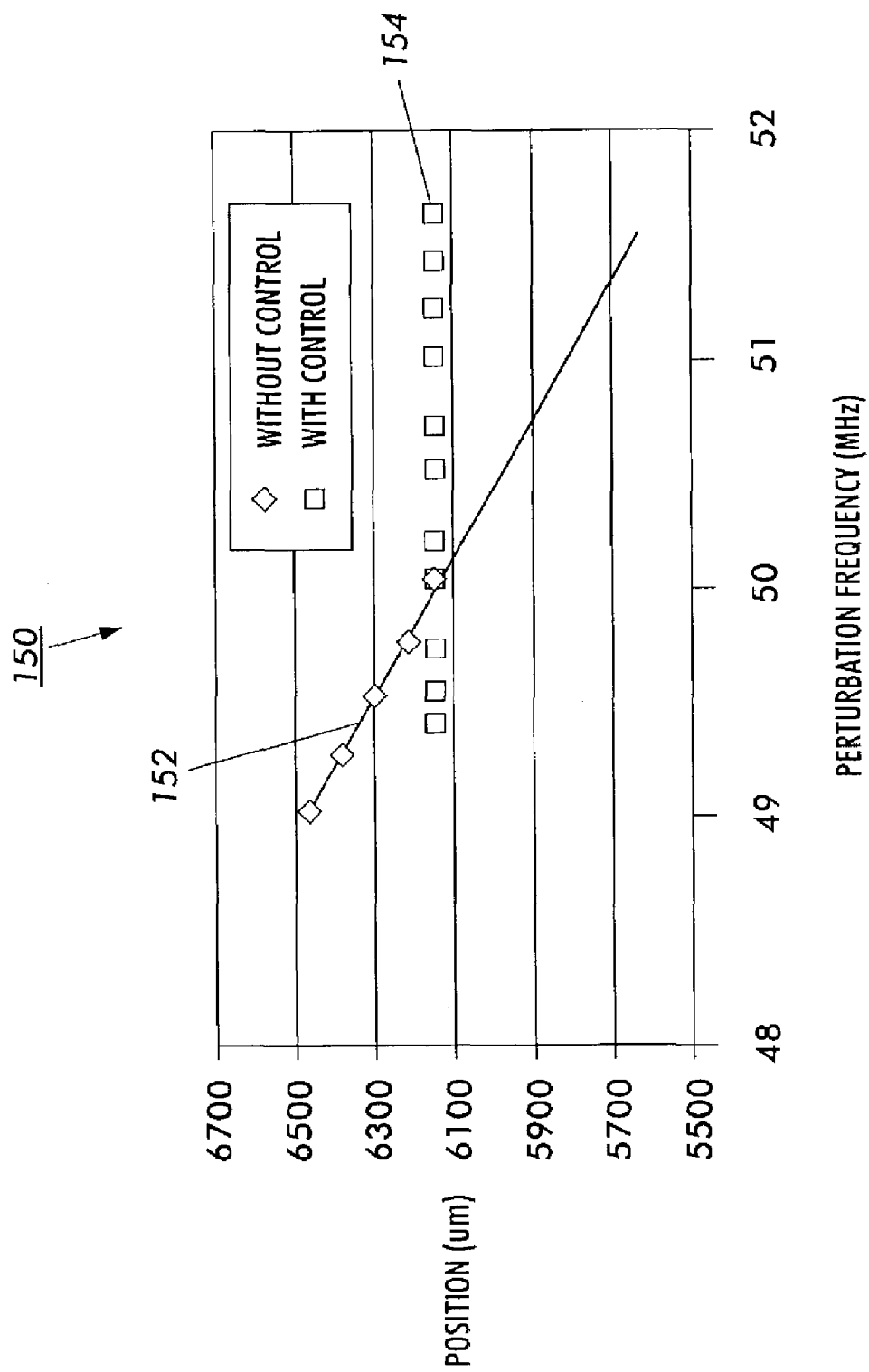
FIG. 7 shows control loop beam stabilization results for one embodiment and operation of the present application.

An attribute of control system 100 is the efficiency and speed with which the system returns the main beam portion to its intended position. FIG. 7 is a chart 150 demonstrating the operational capability of the control system 100 of FIG. 6.

Chart 150 compares the beam position versus the perturbation frequency. In experimental operation of control system 100, the inventors intentionally inserted an increase in frequency which altered the output from beam deflector 106. The desired operational position is at slightly above 6100 $\mu$m when there is a frequency of approximately 50 MHz. When no feedback control is provided and a perturbation offset is introduced, the position of the main beam is not maintained at a consistent location as shown by no-control points 152. Rather, altering of the deflector drive frequency moves the beam position. However, when control circuitry of FIG. 6 is implemented, the control system compensates for the generated offset which occurs due to the perturbation, as shown by control points 154. In experimental observations, a +/−1/60 beam width feedback control jitter was achieved on a 1 mrad angular divergence optical laser beam over 3.5 mrad position adjustment range. This was obtained with off-the-shelf components, and improved results would be obtained by using components specifically designed for the systems of the present application.

Figure 8A:
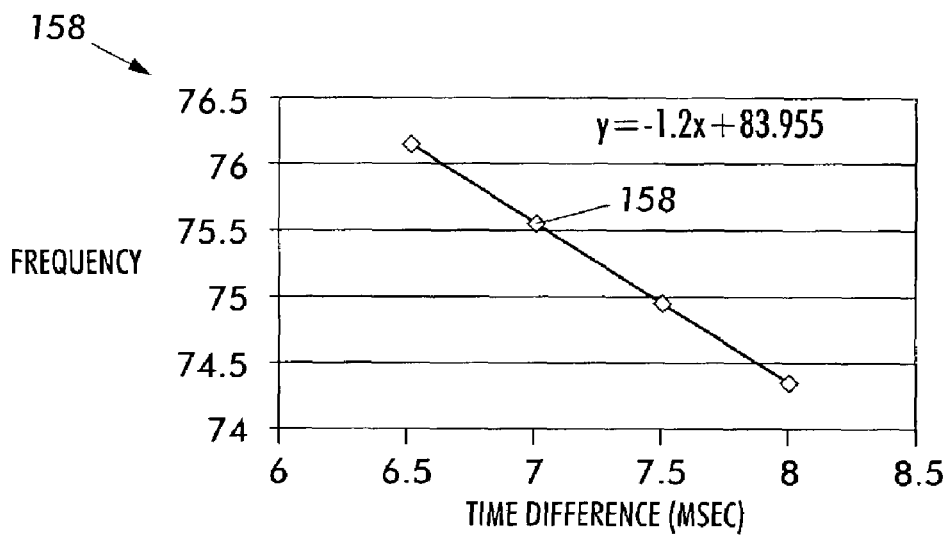
FIGS. 8A and 8B depict the results of controlled beam steering for the closed-loop characterization and calibration of the system in accordance with FIG. 6.
Figure 8B:
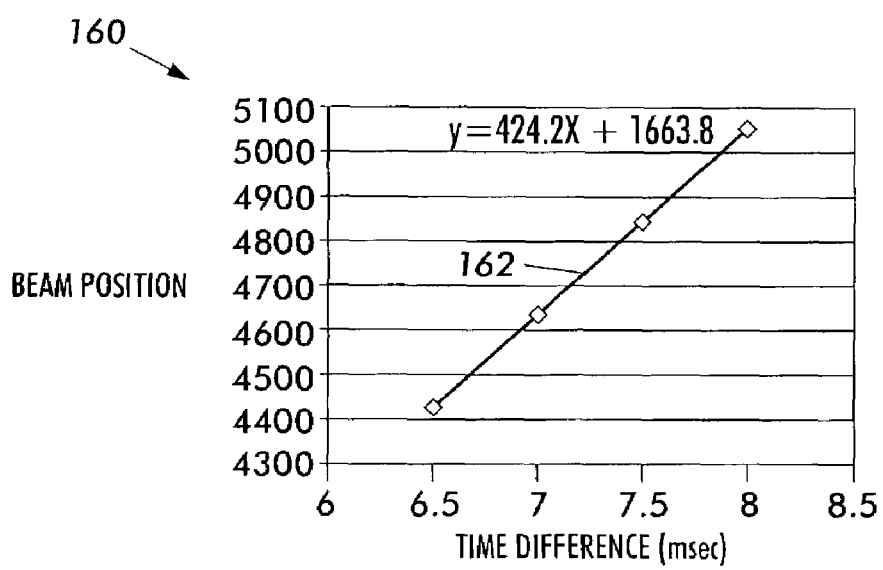

Turning to FIGS. 8A and 8B, set forth are results of experiments using a control system such as described in connection with FIG. 6. Chart 156 of FIG. 8A plots the frequency supplied to beam deflector 106 versus the time difference in the detected signals generated from the satellite beams. The changing of the frequency occurs during a beam steering operation. Plot line 158 emphasizes a characteristic of what happens when the frequency keeps changing the beam position. The time difference exists as the satellite beams continue to hit the sensors at different points. Chart 160 of FIG. 8B shows the beam position versus the time difference as plot line 162 which emphasizes the changing beam position. These charts reflect the experimental performance of the linear deflection positioning, time difference signals and beam deflector drive frequency.

Figure 9:
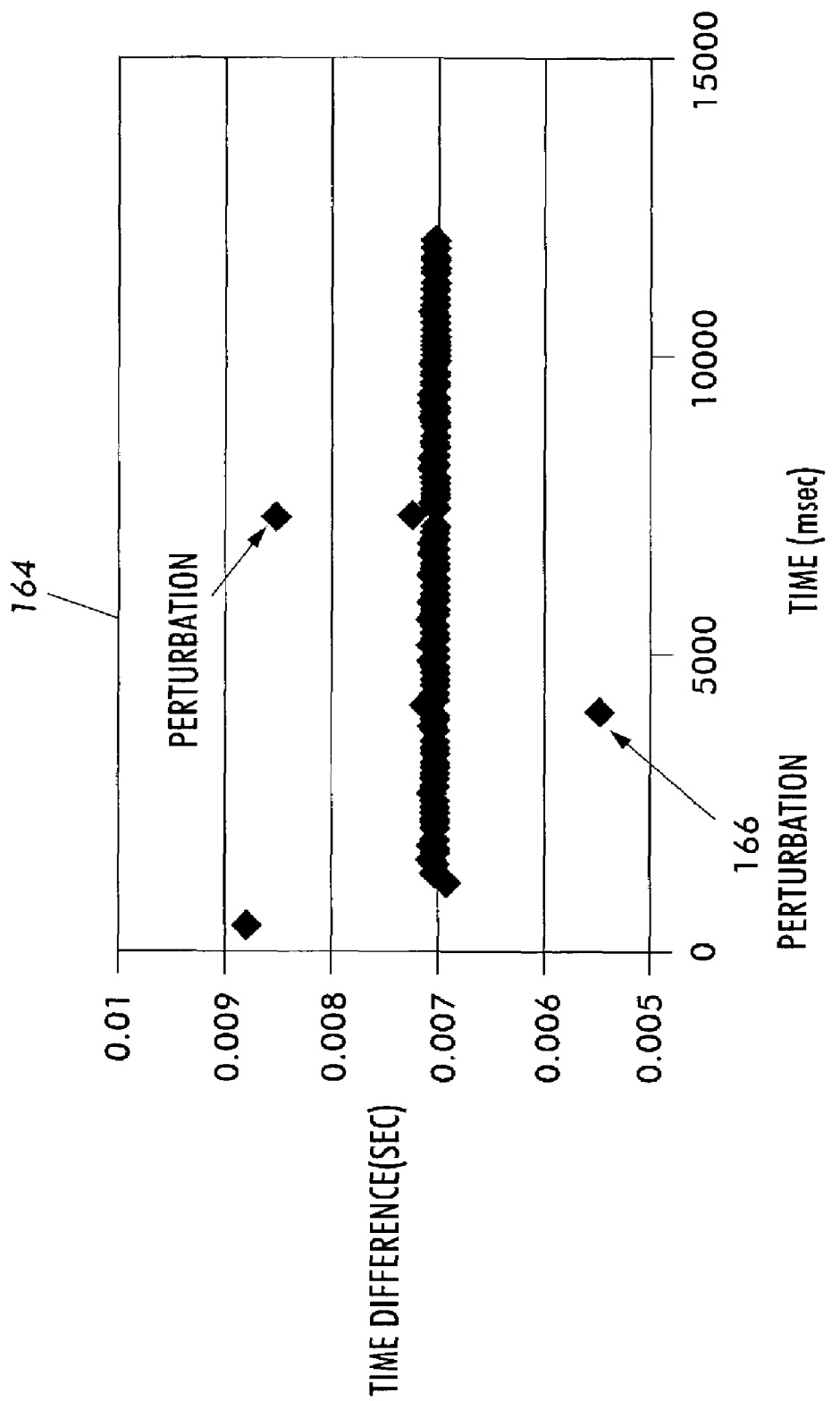
FIG. 9 sets forth the response versus time for closed loop correction and settling when a perturbation is applied to a main beam generated in a system such as shown in FIG. 6.
Figure 10:
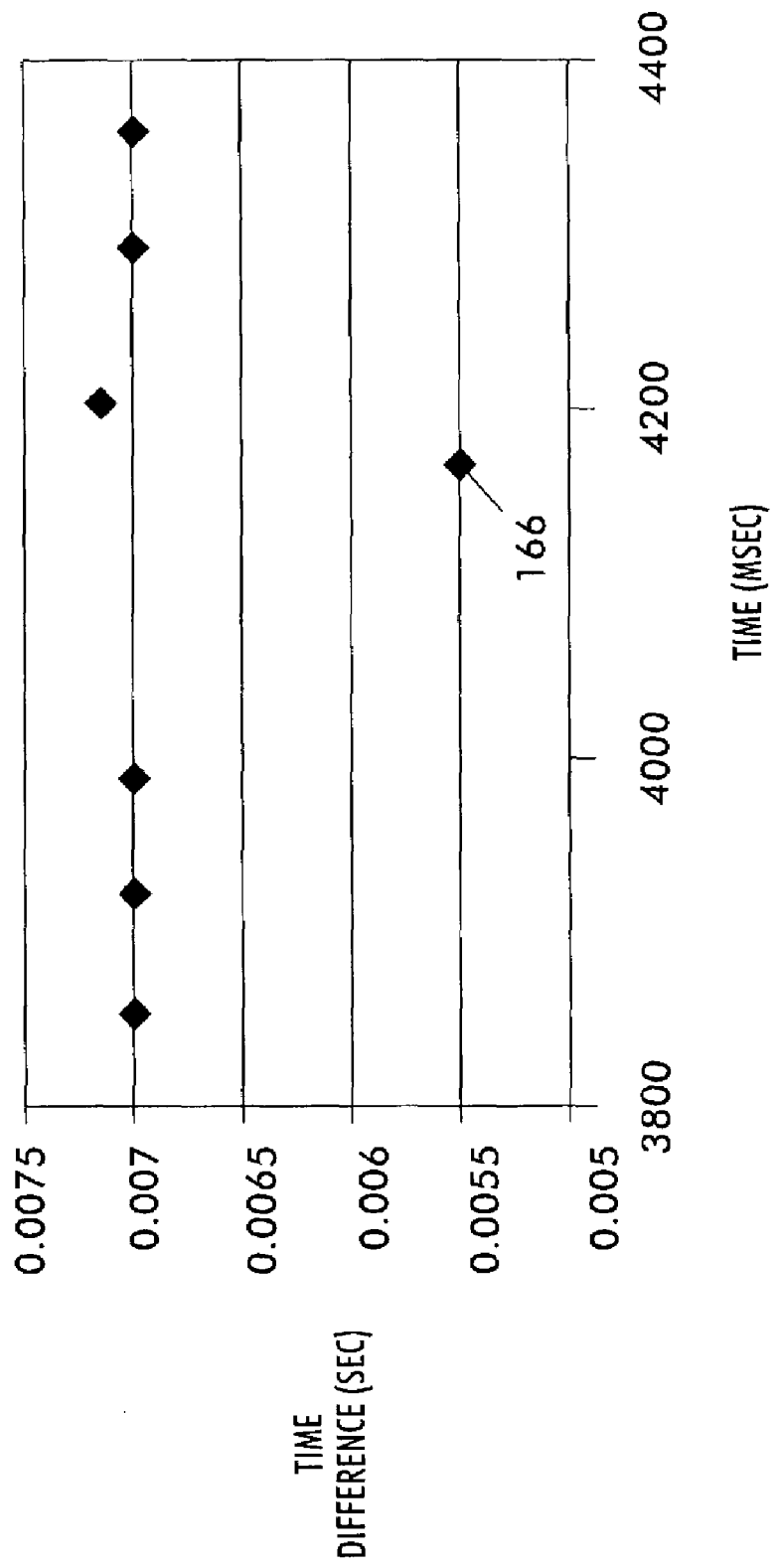
FIG. 10 is an expanded scale of the graph of FIG. 9.

Chart 164 of FIG. 9 shows the response transient time to return the detector crossing time difference sensing signal to a desired level, when, for example, a perturbation of main optical beam position causes a perturbation time difference 166, to deviate from the desired value. FIG. 10 is an expanded scale of the time response of FIG. 9. For example, when perturbation is applied to the system (in an experimental operation), perturbation time difference change 166 is shown to occur (e.g., from 0.007 sec to 0.005 sec—in this case the perturbation decreases the time difference, which means the system had an intended $\Delta t$ of 0.007). However, using the active closed loop control of FIG. 6, the system adjusts to the desired offset time difference (e.g., 0.007 sec). Particularly, as shown in FIG. 10, the time difference in seconds is normally 0.007 seconds. At a time of approximately 4180 msec, the perturbation causes the perturbation time difference 166. During a satellite beam scan cycle (i.e., within about 20 msec in this laboratory implementation), the operational control of FIG. 6 settles control back to the desired time difference (i.e., the beam is directed back to its intended alignment position). It is to be understood, the 20 msec cycle time in this case was limited by the particular control electronic used. Ultimately, the scan cycle time is limited by the satellite beam scanner capability, which is typically in the microsecond range for acoustooptic modulators, limited by the transit time of the acoustic wave across the optical beam.

As previously mentioned, the inventors have undertaken experimental operations using a system as shown in FIG. 6. Listed below for single-beam fine angles is a summary of various specifications which have been achieved and those that are considered realizable for systems employing the described methods. It is to be understood this chart is not intended to limit the realizable ranges of systems configured in accordance with the disclosed methods.

| Specs: | Demo | Realizable Ranges of Parameter for Method Described |
|---|---|---|
| Position Sensing Range | 6 beam widths 3.4 mrad | 2 to 100 |
| Position Sensing Precision | .015 beam width. .02 mrad | |
| Position Sensing Accuracy | .015 beam width .w. [Est] | similar |
| Position Sensing Updates | 20 msec (bus limited) | .01 to 1 msec |
| Feedback Settling-AO scanner | 80 msec | 0.01 msec |
| Feedback Settling-mirror | | 1–10 msec |
| Wavelength [detector material] | 632.8 nm | 300–10000 nm |
| Optical Insertion Loss [Off] | <0.05 dB | |
| Optical Insertion Loss [On] | 1 dB nominal | <0.2 dB |
| 2D XY sensing [dual system] | | similar to 1D |
| Min Optical satellite Beam Power | 0.1 mw | 0.01 mw [Est-TBD] |
| Max optical beam power | approx. 5 miliwatts | est 5 watts or more |

The above-described systems and methods provide beam position sensing which has a minimal impact on a main beam or its use. Also, the use of satellite beams avoids excess power on the position sensors when the main beam carries high optical power. The system provides a highly precise and accurate beam sensing operation, which maybe <1/60 beam diameter or 1/60 millirandian. The described systems and methods also provide for a fast sensing down to the order of microsecond scan times through the use of a fast satellite beam generator such as the acousto-optic cell. Use of scan or dithered sensing operations permit for a robustness with respect to noise and long-term drift. The symmetric configuration of the satellite beams cancels out potential uncertainties, systematic errors and drifts, present in other systems such as asymmetric systems. The system configuration permits calibration stability and monitoring of the calibration during operation of the sensing system.

In addition to the foregoing, the two-axis system provides independent sensing of position along two non-collinear axes. Further, the operations on the two axes may be considered to by synergistic. Particularly, two sensing operations can be accomplished simultaneously or sequentially, in phase or out of phase, synchronous or asynchronous. The two-axis system maybe beneficial in the use of sense operations and control operations in a two-axis mirror system by alternating the sense and adjustment on the two axes.

Implementing the concepts in control systems such as described, takes advantage of using generation and position sensing of the symmetric scanned satellite beams to precisely and robustly sense the position of a main beam, in combination with an active closed-loop control actuation to position the main beam. It is to be appreciated, and as has been described previously, that the beam may be controlled to be centered at a nominal centerline position, or controllably offset by a desired amount. The two beam approach combines the symmetric beam sensing with the, acousto-optic deflector to reposition the main beam portion in a fast, non-interfering manner. Further, the combination of the symmetric sensing operations to the calibrated control deflection also provides fast, servo convergence of the position sensing operation and control processes.

It is to be understood that many alterations to the systems and methods described herein may be appreciated by one upon reading and understanding of the present description. It is understood that all alterations and modifications to the foregoing described systems and methods may be undertaken without departing from the spirit and scope of the invention as determined by the following claims and their equivalents.

What is claimed is:

1. A beam position sensing system comprising:
   a beam source configured to generate a directed beam;
   a satellite beam generator aligned to receive the directed beam and to transmit a main beam and generate a pair of symmetric satellite beams having time-varying deflection angles from the main beam;
   a first detector arrangement positioned to detect a first satellite beam of the pair of satellite beams and generate a first detector signal; and
   a second detector arrangement positioned to detect a second satellite beam of the pair of satellite beams and generate a second detector signal,
   wherein the first detector signal and the second detector signal are used to determine an absolute position of the main beam.

2. The system according to claim 1, wherein the symmetric satellite beams are oppositely positioned from each other and are an equally spaced linearly increasing distance from the main beam.

3. The system according to claim 1, wherein the satellite beam generator is a scanning beam generator which scans the first satellite beam and the second satellite beam, while transmitting the main beam in a substantially, undisturbed direction.

4. The system according to claim 1, wherein the first detector arrangement is a set distance in a first direction from a centerline, and the second detector arrangement is located a set distance in a second direction from the centerline, each detector arrangement positioned to detect one of the satellite beams of the pair.

5. The system according to claim 4, wherein the main beam is offset ($\Delta x$) from the centerline.

6. The system according to claim 5, wherein the offset ($\Delta x$) value of the main beam is found by:

$$\Delta x = [t_1 - t_2] * V/2,$$

wherein $t_1$ is a time one of the first detector system and the second detector system is scanned,
$t_2$ is a time the other one of the first detector system and the second detector system is scanned, and
V is the velocity at which the scan of the first and second detector arrangements occurs, which are the same.

7. The system according to claim 3, wherein the scanning of the first satellite beam and the scanning of the second satellite beam begin at substantially the same time and detection of the first satellite beam by the first detector arrangement and detection of the second satellite beam by the second detector arrangement occurs at different times, determining the main beam position.

8. The system according to claim 7, wherein the main beam is minimally disturbed in magnitude and direction.

9. The system according to claim 1, wherein the satellite beam generator is an acousto-optic modulator.

10. The system according to claim 1, wherein the satellite beam generator is an acousto-optic modulator with Q<1.

11. The system according to claim 1, wherein the satellite beam generator is an acousto-optic modulator with a Q approximately equal to 1.

12. The system according to claim 1, wherein deflection of the first and second satellite beams are at angles linearly proportional to a sweep frequency supplied to the satellite beam generator.

13. The system according to claim 1, wherein the first and second satellite beams each have a linear velocity in the plane of the detector arrangements which are of a substantially equal constant magnitude in opposite directions to each other.

14. The system according to claim 3, wherein a scan position versus time is nonlinear.

15. The system according to claim 9, wherein the acousto-optic modulator is operated in an axial mode with a low enough acousto-optic Q to a level to produce the pair of symmetric satellite beams.

16. The system according to claim 9, wherein the acousto-optic modulator is operated in an axial mode with an acousto-optic Q of approximately 1.

17. The system according to claim 1, wherein the first detector arrangement and the second detector arrangement are each one of differential split detectors or position sensing detectors.

18. The system according to claim 1, wherein the pair of symmetric satellite beams are a first pair of satellite beams generated at one of an x axis or a y axis at an angle to each other.

19. The system according to claim 18, further including
   a second pair of satellite beams including a first satellite beam of the second pair and a second satellite beam of the second pair, the second pair of satellite beams in one of an x axis or a y axis at an angle to each other.

20. The system according to claim 19, wherein the first pair of satellite beams and the second pair of satellite beams are perpendicular to each other.

21. The system according to claim 19, further including a third detector arrangement and a fourth detector arrangement, each positioned to detect one of the satellite beams of the second pair of satellite beams.

22. A method of sensing a position of a beam emitted:
aligning a satellite beam generator to receive the directed beam;
receiving the directed beam by the satellite beam generator;
generating by the satellite beam generator a pair of symmetric satellite beams;
transmitting through the satellite beam generator a main beam;
temporally varying a deflection angle of the satellite beams relative to the main beam;
aligning a first detector arrangement to receive a first satellite beam of the pair of satellite beams;
aligning a second detector arrangement to receive a second satellite beam of the pair of satellite beams, wherein the first and second detector arrangements are separated a fixed distance;
sensing, by the first detector arrangement, the first satellite beam;
sensing, by the second detector arrangement, the second satellite beam; and
determining a position of the main beam relative to the first and second detector arrangements based on the sensed first satellite beam and the sensed second satellite beam.

23. The method according to claim 22, wherein the aligning of the first detector arrangement and the second detector arrangement includes,
determining a centerline for referencing of the main beam;
positioning the first detector arrangement a set distance from the centerline in a first direction, and
positioning the second detector arrangement a set distance from the centerline in a second direction.

24. The method according to claim 22, further including scanning the first satellite beam and the second satellite beam, while transmitting the main beam in a substantially undisturbed direction.

25. The method according to claim 24, wherein the scan of the first satellite beam and the scan of the second satellite beam have a substantially equal velocity magnitude.

26. The method according to claim 24, wherein the step of generating the pair of satellite beams includes deflecting the first and second satellite beams at angles linearly proportional to a sweep frequency supplied to the satellite beam generator.

27. The method according to claim 24, wherein the first and second satellite beams each have a linear velocity in a plane of the detector arrangements which are substantially equal magnitude in opposite directions to each other.

28. The method according to claim 24, wherein the scan velocity is nonlinear.

29. The method according to claim 24, wherein the satellite beam generator is an acousto-optic modulator, and further including operating the acousto-optic modulator in an axial mode with an effective acousto-optic Q low enough produce the pair of satellite beams.

30. The method according to claim 24, wherein the satellite beam generator is an acousto-optic modulator, and further including operating the acousto-optic modulator in an axial mode with an effective acousto-optic Q of approximately 1.

31. The method according to claim 22, wherein the pair of symmetric satellite beams are a first pair of satellite beams generated in one of an x axis or a y axis at an angle to each other.

32. The method according to claim 31, further including a second pair of satellite beams including a first satellite beam of the second pair and a second satellite beam of the second pair, the second pair of satellite beams in one of an x axis or a y axis at an angle other than the axis of the first pair of satellite beams.

33. The method according to claim 31, wherein the first pair of satellite beams and the second pair of satellite beams are perpendicular to each other.

34. The method according to claim 32, further including a third detector arrangement and a fourth detector arrangement, each positioned to detect one of the satellite beams of the second pair of satellite beams.

35. The method according to claim 22, wherein the method of generating the pair of symmetric satellite beams is accomplished by an acousto-optic modulator.

36. The method according to claim 35, further including:
determining a scan velocity ($V_x$) for at least one of the satellite beams; and
calibrating the scan velocity ($V_x$) for at least one of the satellite beams, by
determining the distance between the detectors,
measuring a precisely measurable frequency variable, and
measuring a precisely measurable time variable.

37. The method according to claim 35, further including:
determining an initial beam position deviation ($x_0$) of at least one of the satellite beams from the main beam; and
calibrating the at least one initial beam position deviation of the at least one satellite beam,
determining the distance between the detectors,
measuring a precisely measurable frequency variable, and
measuring a precisely measurable time variable.

38. A beam position sensing system comprising:
a beam source configured to generate a directed beam;
a satellite beam generator aligned to receive the directed beam and to transmit a main beam and generate a single-sided satellite beam in a predictable variable manner; and
a detector arrangement positioned to detect the satellite beam and generate a detector signal, the detector signal is used to determine a dynamic position of the main beam from a point of reference.

39. The system according to claim 38, wherein the satellite beam is an acousto-optic cell operating in a Bragg mode.

40. The system according to claim 38, wherein the satellite beam is positioned a spaced linearly increasing distance from the main beam.

41. The system according to claim 38, wherein the satellite beam generator is a scanning beam generator which scans the satellite beam at a known velocity, while transmitting the main beam in a substantially, undisturbed direction.

42. The system according to claim 38, wherein the detector arrangement is a set distance from a reference line, the detector arrangement positioned to detect the satellite beam.

43. The system according to claim 38, wherein the detector arrangement is one of a differential split detector or a position sensing detector.

44. A method of sensing a position of a main beam:
aligning a satellite beam generator to receive a directed beam;

receiving the directed beam by the satellite beam generator;

generating by the satellite beam generator a single-sided satellite beam;

transmitting through the satellite beam generator the main beam;

varying a deflection angle of the satellite beam in a known pattern relative to the main beam;

aligning a detector arrangement to receive a satellite beam;

sensing, by the detector arrangement, the satellite beam; and determining an absolute position from a point of reference of the main beam based on the sensed satellite beam.

45. The method according to claim 44, wherein the generating step includes operating an acousto-optic cell in a Bragg mode.

46. The method according to claim 44, wherein the aligning of the detector arrangement includes, determining a reference line for a location of the main beam; and positioning the detector arrangement a set distance from the reference line in a first direction.

47. The method according to claim 44, further including scanning the satellite beam, while transmitting the main beam in a substantially undisturbed direction.

48. The method according to claim 47, wherein the scanning step includes scanning at a known velocity.

49. A method of sensing a position of an emitted beam comprising:

generating a main beam;

generating at symmetric satellite beams with a satellite beam generator while leaving the main beam substantially unperturbed;

varying a deflection angle of the satellite beam relative to the main beam detecting the satellite beams with detector arrangements as their positions change relative to the main beam;

determining a position of the main beam relative to the first and detector arrangements based on the sensed satellite beams.

* * * * *